(12) United States Patent
Gehrke et al.

(10) Patent No.: US 8,398,945 B2
(45) Date of Patent: Mar. 19, 2013

(54) REMOVAL OF AMMONIA NITROGEN, AMMONIUM NITROGEN AND UREA NITROGEN BY OXIDATION WITH HYPOCHLORITE-CONTAINING SOLUTIONS FROM EXHAUST AIR IN PLANTS FOR PRODUCING AMMONIA AND UREA

(75) Inventors: Helmut Gehrke, Bergkamen (DE); Dennis Lippmann, Dortmund (DE)

(73) Assignee: Thyssenkrupp Uhde GmbH, Dortmund (DE)

( * ) Notice: Subject to any disclaimer, the term of this patent is extended or adjusted under 35 U.S.C. 154(b) by 6 days.

(21) Appl. No.: 13/133,780

(22) PCT Filed: Nov. 27, 2009

(86) PCT No.: PCT/EP2009/008452
§ 371 (c)(1),
(2), (4) Date: Aug. 2, 2011

(87) PCT Pub. No.: WO2010/066344
PCT Pub. Date: Jun. 17, 2010

(65) Prior Publication Data
US 2011/0280779 A1    Nov. 17, 2011

(30) Foreign Application Priority Data
Dec. 12, 2008  (DE) .......................... 10 2008 061 674

(51) Int. Cl.
B01D 53/34  (2006.01)
B01D 47/00  (2006.01)
B01D 53/56  (2006.01)
B01D 53/50  (2006.01)

(52) U.S. Cl. .... 423/237; 423/210; 423/235; 423/243.06
(58) Field of Classification Search .................. None
See application file for complete search history.

(56) References Cited

U.S. PATENT DOCUMENTS

| 3,732,164 A | * | 5/1973 | Pressley et al. | ............... 210/752 |
| 5,096,599 A | * | 3/1992 | Granelli | ......................... 210/750 |
| 5,512,182 A | * | 4/1996 | Sheikh et al. | ................. 210/668 |
| 5,750,780 A | * | 5/1998 | Rescalli | ........................... 564/67 |

(Continued)

FOREIGN PATENT DOCUMENTS

| CN | 101073743 A | 11/2007 |
| EP | 0099176 A1 | 1/1984 |

(Continued)

OTHER PUBLICATIONS

International Search Report for PCT/EP2009/008452 with English translation, Completed by the European Patent Office on Mar. 31, 2010, 4 Pages all together.

(Continued)

*Primary Examiner* — Patricia L Hailey
*Assistant Examiner* — Sheng H Davis
(74) *Attorney, Agent, or Firm* — Brooks Kushman P.C

(57) ABSTRACT

Process for scrubbing out ammonia nitrogen and/or ammonium nitrogen and/or urea nitrogen from exhaust gases enriched with these nitrogen compounds in plants for producing ammonia or urea, wherein the nitrogen compounds first form with a hypochlorite-containing solution in a scrubber an intermediate which under acidic or neutral reaction conditions is reacted to form elemental nitrogen and salt, and the reaction of the nitrogen compounds to form elemental nitrogen and salt proceeds in a pH range of 4 to 6.

14 Claims, 2 Drawing Sheets

U.S. PATENT DOCUMENTS

Figure 1:
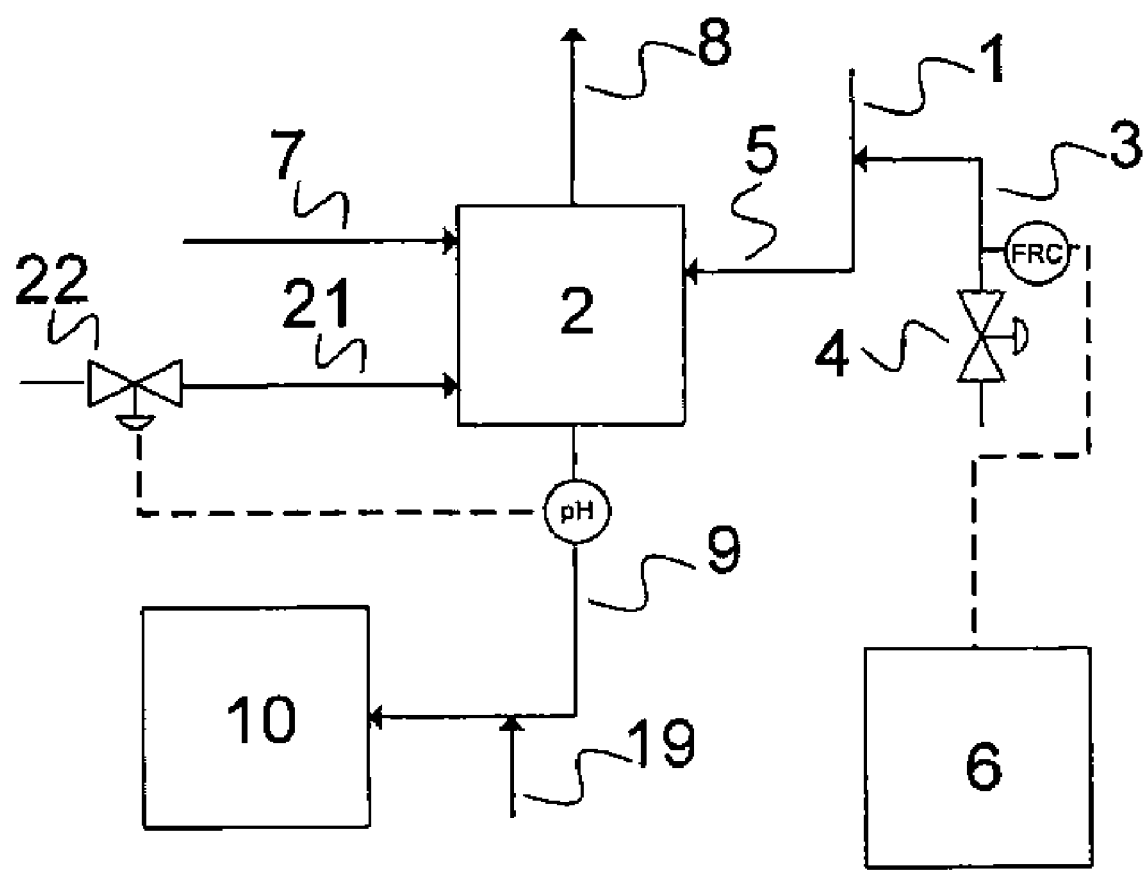

| | | |
|---|---|---|
| 6,994,793 B2 | 2/2006 | Spalding et al. |
| 2003/0234224 A1* | 12/2003 | Spalding et al. ............. 210/758 |

FOREIGN PATENT DOCUMENTS

| | | | |
|---|---|---|---|
| EP | 0669850 B1 | | 9/1995 |
| GB | 1496143 | | 12/1977 |
| GB | 2047217 A | | 11/1980 |
| GB | 2383034 A | | 6/2003 |
| JP | 52114565 A | | 9/1977 |
| JP | 54013429 B | | 1/1979 |
| JP | 5505743 A | | 1/1980 |
| JP | 56031424 A | | 3/1981 |
| JP | 05161818 | * | 6/1993 |
| JP | 2000001466 | * | 1/2000 |
| WO | 03099721 A1 | | 12/2003 |
| WO | 2005/075355 | * | 8/2005 |
| WO | 2006061082 A1 | | 6/2006 |

OTHER PUBLICATIONS

Spalding et al. "A Chemox Treatment for Urea- and Ammonium-Contaminated Groundwater", Remediation Winter 2005, p. 55-63.

Lobanov et al. "Wastewater Purification to Remove Ammonium Ions by the Oxidation Method", Russian Journal of Applied Chemistry 2006, vol. 79, No. 10, p. 1617-1620.

* cited by examiner

REMOVAL OF AMMONIA NITROGEN, AMMONIUM NITROGEN AND UREA NITROGEN BY OXIDATION WITH HYPOCHLORITE-CONTAINING SOLUTIONS FROM EXHAUST AIR IN PLANTS FOR PRODUCING AMMONIA AND UREA

CROSS-REFERENCE TO RELATED APPLICATION

This application is the U.S. national phase of PCT Appln. No. PCT/EP2009/008452 filed Nov. 27, 2009 which claims priority to German application DE 10 2008 061 674.5 filed Dec. 12, 2008, the disclosures of which are incorporated in their entirety by reference herein.

The invention relates to a process for removing ammonia nitrogen, ammonium nitrogen, and urea nitrogen by oxidation with hypochlorite-containing solutions from exhaust air produced in plants for producing ammonia and urea. The reaction of ammonia nitrogen, ammonium nitrogen, and urea nitrogen in this process is to be carried out under acidic or neutral reaction conditions. In addition, the invention is to provide apparatus for implementing the process of the invention.

In the production of ammonium-containing fertilizers and in the production of fertilizers which may give off ammonia, such as urea-containing fertilizers, for example, various process states produce ammonia-, ammonium-, and/or urea-containing exhaust air streams which, with regard to the environmental pollution that such nitrogen compounds entail, must be cleaned before being delivered to the environment.

The removal of ammonia from exhaust air is achieved, in the processes known from the patent literature, by means of addition of sulfuric acid or nitric acid. The ammonia is removed via chemical absorption of the exhaust air stream and is converted into the corresponding ammonium salt. Using nitric acid leads to formation of ammonium nitrate, and using sulfuric acid results in the formation of ammonium sulfate.

These solutions containing ammonium salt, then, form wastewater streams which cannot be immediately delivered to the environment. To do so would cause considerable environmental pollution, which would have consequences to a considerable degree, by eutrophication, on flora and fauna. Using nitric acid carries the risk of formation, from residual traces of urea, of urea nitrate, which is unstable and tends toward decomposition. One option would be costly and inconvenient further-processing of the ammonium salts present in the wastewater streams, to form ammonium sulfate fertilizer or to form nitrogen phosphorus potassium (NPK) fertilizer. This separate further-processing of the ammonium salts formed is very capital-intensive and energy-intensive, and so alternatives are sought.

An approach to recycling a resultant ammonium salt stream in a urea production process is described in EP 0099176 A1. The disadvantage of this method, however, is that ammonium salt contaminations adversely affect the quality of the end product, in this case urea. For example, the resultant urea will not be able to be used for producing melamine.

WO 06/061082 A1 proposes treating the ammonium salt-containing wastewater streams that are produced in the removal of ammonia from exhaust air, by means of electrodialysis, thereby recovering the acid used in the process, and forming an aqueous stream which is enriched in ammonium hydroxide salts. In this case, in other words, the ammonium salt-containing wastewater stream is subjected to a costly and inconvenient reprocessing.

A further example of costly and inconvenient reprocessing of the resultant ammonium salt-containing wastewater stream in the context of the removal of ammonium nitrogen compounds from exhaust air is set out in WO 03/099721. Here, the resultant ammonium salt is treated with peroxides at elevated temperatures. In a decomposer unit, the ammonium salt is decomposed to form $NH_3$, $CO_2$ and $H_2O$, and can be used again in the urea synthesis unit. In that case, however, the added peroxide could result in unwanted secondary effects.

A process for treating groundwater containing nitrogen components, such as ammonia, urea, and nitrates, for example, is presented in U.S. Pat. No. 6,994,793 B2. The contaminated groundwater is admixed with chemical oxidizing agents, which oxidize the nitrogen components into nitrogen gas. Oxidizing agents used here may be, for example, hypochlorite, hypobromite, hypoiodite, Fenton reagents, or combinations of these reagents. The resultant nitrogen gas is delivered to the environment. In further, downstream process stages, the groundwater can be cleaned to remove other disrupting components.

In Lobanov et al., Russ. J. Appl. Chem. 79(10) (2006), 1617-1620, a process similar to that of U.S. Pat. No. 6,994,793 B2 is described for removing ammonium compounds from solutions. Set out in detail are studies into the conversion of the ammonium compounds as a function of reaction time, the oxidizing agent, the stoichiometric excess of the oxidizing agent, and the temperature. Likewise, in Spalding et al., REMIDIATION winter 2005, 55-63, experiments are described into the treatment of ammonium-containing and/or urea-containing solutions on the laboratory scale, and also on the semi-industrial scale.

All of the methods recited above for the removal of nitrogen components through the use of oxidizing agents take account exclusively of the cleaning of solutions, but not of exhaust air which is to be cleaned. An example of exhaust air cleaning of sanitary installations by means of a hypochlorite-containing solution is described in GB 2047217 A1. Here, a gas which is to be cleaned, and which comprises the odorizing substances hydrogen sulfide and ammonia, is passed in countercurrent to a sodium hypochlorite solution through a column packed with a nickel peroxide catalyst material. The hypochlorite solution in this case has a pH of between 7.5 and 11.0. This basic pH is necessary in order to prevent the entrainment of Ni (II) compounds from the catalyst material that would take place in an acidic medium.

EP 0669850 B1 claims a similar process in which, again, a catalyst is provided and in which hypochlorite is used as an oxidizing agent in the basic pH range. This specification claims the removal of one or more organic substances and/or odorants from gas streams. In addition, moreover, recycle lye is mixed with the fresh oxidizing agent solution, and the catalyst bed is arranged such that it is full of lye even if the lye stream is interrupted.

JP 56031424 AA describes a process in which, in a first stage, the gas to be cleaned is subjected to a strongly alkaline scrub at a pH of 10-13, before being subjected, in a second stage, to a hypochlorite scrub, where a pH of 6-8 is set. In this case, ammonium compounds present in the gas to be cleaned would be converted, in the first scrubbing stage, into free ammonia, which would then be oxidized in the second stage. Moreover, the invention is aimed at the removal of foul-smelling gases, and does not teach the removal of urea compounds.

JP 5505743 AA describes a plant for deodorizing a waste gas. Here, a scrubbing solution is used which is adjusted to a pH of 6-8 by means of a pH control unit. Deodorization then takes place by conversion of ammonia into nitrogen and water, and of hydrogen sulfide by conversion into sulfuric acid. Here again, there is no teaching of the removal of urea and ammonium compounds, which are not encompassed by the term "foul-smelling substances". Under alkaline reaction conditions, as the skilled person is aware, it is likely, in the case of urea, that halogenated hydrocarbons will be formed, and so removal of urea cannot have been intended either by the process described.

GB 1496143 A claims a process in which, in a first stage, the waste gas to be treated is passed through an alkaline scrub and then, in a second stage, foul-smelling components are removed by oxidizing agents. Here, hydrogen sulfide is described as the component which is to be removed. However, the removal of ammonia, sulfur dioxide, and carbon monoxide is also said to be ensured in this way. The removal of ammonium compounds and urea compounds is not disclosed. As an oxidizing medium, an aqueous solution of chlorine, or a hypochlorite solution, is used. Disadvantageous features of this process, however, are that the ammonium sulfate intermediate formed is converted into ammonium chloride, and there is no oxidative breakdown of the ammonium N, to elemental nitrogen, for example. Consequently, a wastewater stream is produced which contains ammonium N, and has to be worked up separately.

It is an object of the invention to provide a process which allows exhaust air streams containing foul-smelling ammonia, but also ammonium compounds and/or urea compounds which do not represent an odor load, to be reprocessed in such a way that the resulting cleaned waste gases are depleted of these nitrogen compounds. The process has to be amenable to integration into existing ammonia and/or urea plants, and the problem outlined above, of additional wastewater streams to be treated, is no longer to be present. This process is to be designed such that the salts produced by oxidation can be removed in plant parts that are already present.

This is achieved through the use of a process for scrubbing ammonia nitrogen and/or ammonium nitrogen and/or urea nitrogen from waste gases in which these nitrogen compounds have accumulated, in plants for producing ammonia or urea, wherein the nitrogen compounds first form an intermediate with a hypochlorite-containing solution in a scrubber, said intermediate being reacted under acidic or neutral conditions to form elemental nitrogen and salt, the reaction of the nitrogen compounds to form elemental nitrogen and salt taking place in a pH range from 4 to 6.

The basis for the invention is formed by the following reactions:

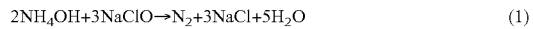

$$2NH_4OH + 3NaClO \rightarrow N_2 + 3NaCl + 5H_2O \qquad (1)$$

or

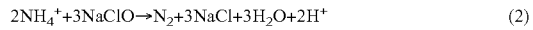

$$2NH_4^+ + 3NaClO \rightarrow N_2 + 3NaCl + 3H_2O + 2H^+ \qquad (2)$$

and

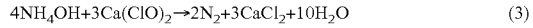

$$4NH_4OH + 3Ca(ClO)_2 \rightarrow 2N_2 + 3CaCl_2 + 10H_2O \qquad (3)$$

and also

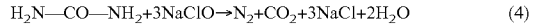

$$H_2N-CO-NH_2 + 3NaClO \rightarrow N_2 + CO_2 + 3NaCl + 2H_2O \qquad (4)$$

The $NH_4OH$ notation in equations (1) and (3) here is intended to indicate that the reactions take place in an acidic or slightly acidic medium. In the case of alkaline reaction conditions, in the case of urea, the formation of halogenated hydrocarbons, more particularly of trichloromethane, is likely. The formation of protons (see equation (2)), or the release of water from ammonium hydroxide, indicates that, in the course of the reaction, the reaction mixture must be adapted in terms of its pH toward the neutral point, by addition of lye.

Taking these reaction equations as a basis, the demand for NaOCl for the removal of 1 t of ammonium is 4.41 t of NaOCl (100%), assuming a stoichiometric consumption, without excess, as an example.

It is therefore useful for the reaction of the nitrogen compounds to form elemental nitrogen and salt to take place in a pH range from 4 to 6 and more preferably in a range from 4.5 to 5.5. If the pH levels were to be even lower, there would, as indicated above, be release of chlorine. This must be avoided at all costs in view of the environmental harmfulness of chlorine that occurs as a consequence of the high reactivity of this chemical element. Setting a particular pH within the claimed pH range of 4-6 can be achieved by measuring the pH in the wastewater from the scrubber, and regulating the pH in this scrubber via an incoming stream through which lye is fed directly into the scrubber or through which lye is introduced into the scrubber by admixture to the hypochlorite-containing solution.

In the case of the here-described reaction of the nitrogen compounds to form elemental nitrogen and salt, a hypochlorite-containing solution is to be employed, which comprises sodium hypochlorite or calcium hypochlorite.

In one advantageous embodiment of the process, the scrub water stream from a scrubber is admixed with the hypochlorite-containing solution, and the reaction of the nitrogen compounds present in the waste gas takes place directly in the scrubber. A wastewater produced in this process from the scrubber is passed into an ion exchanger, in which the salts generated are removed and a cleaned waste gas stream is delivered from the scrubber to the environment.

A further possibility for embodiment of the invention is to carry out the reaction of the nitrogen compounds in the waste gas in a further, separate scrubber downstream of the first scrubber on the gas side, the hypochlorite-containing solution being introduced directly from a collecting container into said further scrubber. A wastewater produced with this process is passed from the scrubber into an ion exchanger, in which the salts generated are removed and a cleaned waste gas stream is delivered from the scrubber to the environment.

In a further embodiment of the invention, the process is operated in circulation, and the salt produced and the elemental nitrogen are recycled to the collecting container for the hypochlorite-containing solution, and a cleaned waste gas stream is delivered to the environment. Moreover, in the collecting container for the hypochlorite-containing solution, the salt concentration is measured, and is regulated in this collecting container via an outgoing stream by which liquid is transported out of the collecting container and hypochlorite-containing solution is fed in replenishment via an incoming stream.

With advantage, the wastewater produced from the scrubber in which the reaction of the nitrogen compounds to form elemental nitrogen and salt takes place, or the outgoing stream from the collecting container, is admixed with a reducing agent selected from a group containing sulfite and hydrogen sulfite. This process step is necessary in order to break down excess hypochlorite, present in the wastewater stream, into chloride. As an example, sodium sulfite is used for this purpose.

The invention is set out below with reference to a working example. Described is the removal of ammonia nitrogen, ammonium nitrogen, and urea nitrogen, by oxidation using hypochlorite-containing solutions, from exhaust air coming from a urea granulation unit. In the granulator, with a throughput of 450 t exhaust air/h, a waste gas is produced which contains 0.08 kg ammonia/t exhaust air and 0.34% by weight of urea. This waste gas stream is then passed to a scrubber, where it is subjected to process condensate. The waste gas leaving this scrub is then composed of 0.08 kg ammonia/t exhaust air and 0.002 g urea/t exhaust air, which according to the conventional state of the art is delivered to the environment. Consequently, approximately 36 kg per hour of ammonia are emitted. The invention, then, involves admixing the process condensate, used here as scrub water in the scrubber, with a sufficient amount of hypochlorite, and thereby scavenging ammonia nitrogen, ammonium nitrogen, and urea nitrogen from the waste gas, by oxidation, and converting it into elemental nitrogen and salt. This assumes, in this example, a hypochlorite consumption of around 145 kg/h, taking a stoichiometric approach. An increased temperature in the scrubber promotes the chemical reaction of the hypochlorite with the respective nitrogen compounds.

Figure 2:
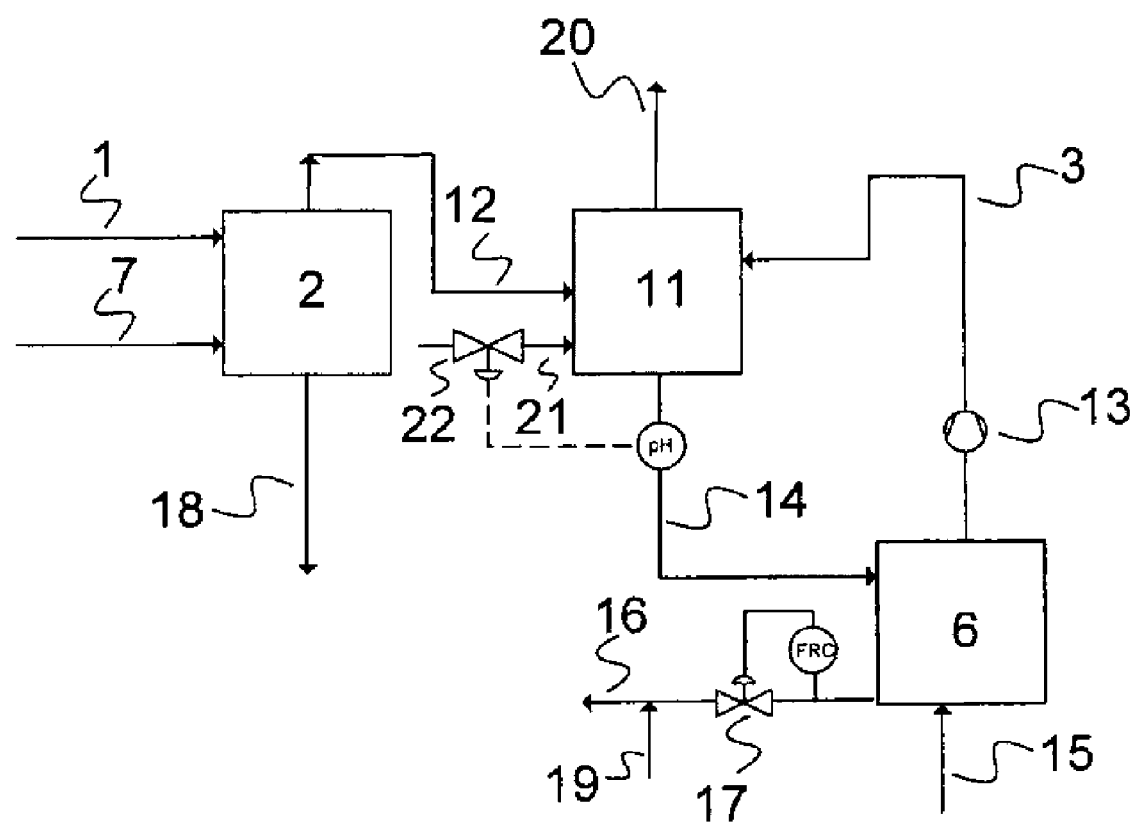

Below, with reference to two figures, two variant embodiments of the working example of the invention that has been set out are elucidated in more detail. In these figures, FIG. 1: shows an inventive diagram of the process, in which the hypochlorite-containing solution for treating the waste gas stream is admixed directly to the scrub water stream from a scrubber;

FIG. 2: shows an embodiment of the invention in which the hypochlorite-containing solution for treating the waste gas stream is introduced into the process via an additional, separate scrubber.

In FIG. 1, the scrub water stream (1) passed to the scrubber (2) is admixed directly, as a mixture (5), via a feed controllable with a valve (4), with the corresponding amount of hypochlorite-containing solution (3). This hypochlorite-containing solution is taken from a collecting container (6). As a result, a large part of the ammonium present in the waste gas stream (7) is oxidized to elemental nitrogen. The waste gas stream in this example comes from a urea granulation. In general, however, all waste gas streams produced in a plant for producing ammonia or urea can be cleaned with the process of the invention. The cleaned waste gas (8) leaves the scrubber (2) and is subsequently delivered to the environment. The wastewater (9) from the scrubber is passed into an ion exchanger (10), in which the salts generated are removed. It is possible here, as shown by way of example, to feed a reducing agent (19) into the wastewater (9) in order to break down excess hypochlorite, present in the wastewater (9), into chloride. In order to ensure that the pH in the scrubber (2) is maintained in a range of 4-6, the pH of the wastewater (9) is measured, the addition of lye (21) to the scrubber (2) being regulated via the valve (22).

With this type of implementation, a simple supply of hypochlorite-containing solution is guaranteed and, moreover, the oxidation of nitrogen with hypochlorite can be carried out in an apparatus which is already integrated in the conventional process. A disadvantage of this process variant is the risk of hypochlorite-containing solution penetrating via the scrubber into other plant parts as well.

In a second process variant, which is shown in FIG. 2, downstream of the scrubber (2) present in conventional plants, and used for cleaning the urea nitrogen present in the waste gas stream (7), is a second scrubber (11), which is fed with the waste gas stream (12) from the first scrubber (2). This scrubber is fed with pure water. A basic scrub, as known from the prior art, is unnecessary. Here, therefore, the scrubbing of ammonium from the waste gas takes place in a separate scrub circuit. The first scrubber (2) is operated in accordance with the prior art, in that a waste gas stream (7) and a scrub water stream (1) are supplied. The wastewater (18) from the scrubber (2) is passed into a collecting container in order to be used again (not shown). The waste gas stream (12) from the scrubber (2), which now, by virtue of its cleaning in the scrubber (2), is very largely free of urea, is passed into the second, downstream scrubber (11).

In the second scrubber (11), hypochlorite-containing solution (3) is supplied via a pump (13) from a collecting container (6). As a result, the nitrogen compounds still present in the waste gas are converted into elemental nitrogen and salt. The cleaned waste gas stream (20) can then be delivered to the environment. The wastewater (14) produced in the scrubber (11), which contains the resultant salts and elemental nitrogen, is passed, in this working example, back into the collecting container (6) for the hypochlorite-containing solution. The pH in the scrubber (11) is monitored by a pH measurement in the wastewater (14), and the addition of the lye (21) is regulated via the valve (22). The collecting container (6) possesses a measuring unit for capturing the salt concentration, which can be regulated via the outgoing stream (16) in conjunction with the valve (17). This outgoing stream (16) is admixed, for example, with sodium sulfite as reducing agent (19). Furthermore, the collecting container is supplied with an incoming stream (15) of fresh hypochlorite-containing solution.

This process variant is associated advantageously with the effect that the waste gas stream from the first scrubber no longer contains urea, and that now all that is necessary is the removal of ammonium, thereby allowing the consumption of hypochlorite-containing solution to be reduced significantly. Furthermore, as a result of the introduction of the second scrubber with independent scrub circuit, there is no feedback to other, upstream systems, and so the possibility of contamination with hypochlorite-containing solution in the other plant parts can be very largely ruled out. Disadvantageous features of this process variant are the increased capital costs, occasioned by the additional scrubber, and the pressure loss caused in the additional scrubber, which must again be compensated via a downstream exhaust air blower. In spite of the disadvantages cited for this variant, the advantages indicated are predominant here.

Both process variants also allow the lye to be added by being admixed, for example, to the hypochlorite-containing solution prior to introduction into the scrubber.

Advantages resulting from the invention:
- elements easy to integrate into existing ammonia and urea plants
- conventional treatment of exhaust air streams by means of acids is no longer necessary.
- the use of expensive catalysts is avoided, resulting in a cost saving.
- costly and inconvenient wastewater treatment/disposal is done away with, since the contaminated exhaust air stream is treated directly, and this is associated with a cost saving.
- a more efficient scrubbing of ammonia, urea, and ammonium compounds from waste gas is achieved by the slightly acidic reaction conditions, since under these reaction conditions there is a transfer of the components present in the waste gas into water-soluble ammonia.

LIST OF REFERENCE NUMERALS 1 scrub water stream
2 scrubber 3 hypochlorite-containing solution
4 valve
5 mixture
6 collecting container
7 waste gas stream
8 cleaned waste gas
9 wastewater
10 ion exchanger
11 second scrubber
12 waste gas stream
13 pump
14 wastewater
15 incoming stream
16 outgoing stream
17 valve
18 wastewater
19 reducing agent
20 waste gas stream
21 lye
22 valve

The invention claimed is:

1. A process for scrubbing ammonia nitrogen and/or ammonium nitrogen and/or urea nitrogen from waste gases in which these nitrogen compounds have accumulated, in plants for producing ammonia or urea, comprising
first forming an intermediate of the nitrogen compounds with a hypochlorite-containing solution in a scrubber: and
reacting said intermediate under acidic or neutral conditions to form elemental nitrogen and salt, the reaction of the intermediate to form elemental nitrogen and salt taking place in a pH range from 4 to 5.5.

2. The process of claim 1, wherein the reaction of the intermediate to form elemental nitrogen and salt takes place in a pH range from 4.5 to 5.5.

3. The process of claim 2, wherein the pH is measured in wastewater from the scrubber, and the pH in the scrubber is regulated via an incoming stream through which lye is fed directly into the scrubber or through which lye is introduced into the scrubber by admixture to the hypochlorite-containing solution.

4. The process of claim 1, wherein the hypochlorite-containing solution comprises sodium hypochlorite or calcium hypochlorite.

5. The process of claim 1, wherein a scrub water stream from a scrubber is admixed with the hypochlorite-containing solution, and the reaction of the nitrogen compounds present in the waste gas takes place in the scrubber.

6. The process of claim 5, wherein a wastewater produced in the scrubber is passed into an ion exchanger, in which salts generated are removed and a cleaned waste gas stream is delivered from the scrubber to the environment.

7. The process of claim 1, wherein the reaction of the nitrogen compounds in the waste gas takes place in a further, separate scrubber, downstream of a first scrubber on the gas side, the hypochlorite-containing solution being introduced directly from a collecting container into said further scrubber.

8. The process of claim 7, wherein a wastewater produced from the further scrubber is passed from the scrubber into an ion exchanger, in which the salts generated are removed and a cleaned waste gas stream is delivered from the scrubber to the environment.

9. The process of claim 7, wherein the process is operated in a circulation, and the salt and elemental nitrogen are recycled to the collecting container for the hypochlorite-containing solution, and a cleaned waste gas stream is delivered to the environment.

10. The process of claim 9, wherein in the collecting container for the hypochlorite-containing solution, the salt concentration is measured, and the salt concentration is regulated in this collecting container via an outgoing stream by which liquid is transported out of the collecting container and hypochlorite-containing solution is fed in as a replenishment via an incoming stream.

11. The process of claim 1, wherein wastewater produced from a scrubber in which the reaction of the intermediate to form elemental nitrogen and salt takes place, or the outgoing stream from a collecting container, is admixed with a reducing agent selected from the group consisting of sulfite and hydrogen sulfite.

12. The process of claim 1, wherein said waste gas is from a urea granulator, and contains ammonia nitrogen, ammonium nitrogen, and urea nitrogen.

13. The process of claim 1, wherein urea is present in said waste gas.

14. The process of claim 1, wherein said waste gas contains urea and the waste gas is first scrubbed in a first scrubber to remove urea, and urea-depleted waste gas from the first scrubber is fed to a second scrubber containing hypochlorite.

* * * * *